Nov. 18, 1969     H. R. WEISS     3,478,867
STACKABLE TRAYS AND PACKAGE FORMED THEREFROM
Filed Oct. 26, 1967     2 Sheets-Sheet 1
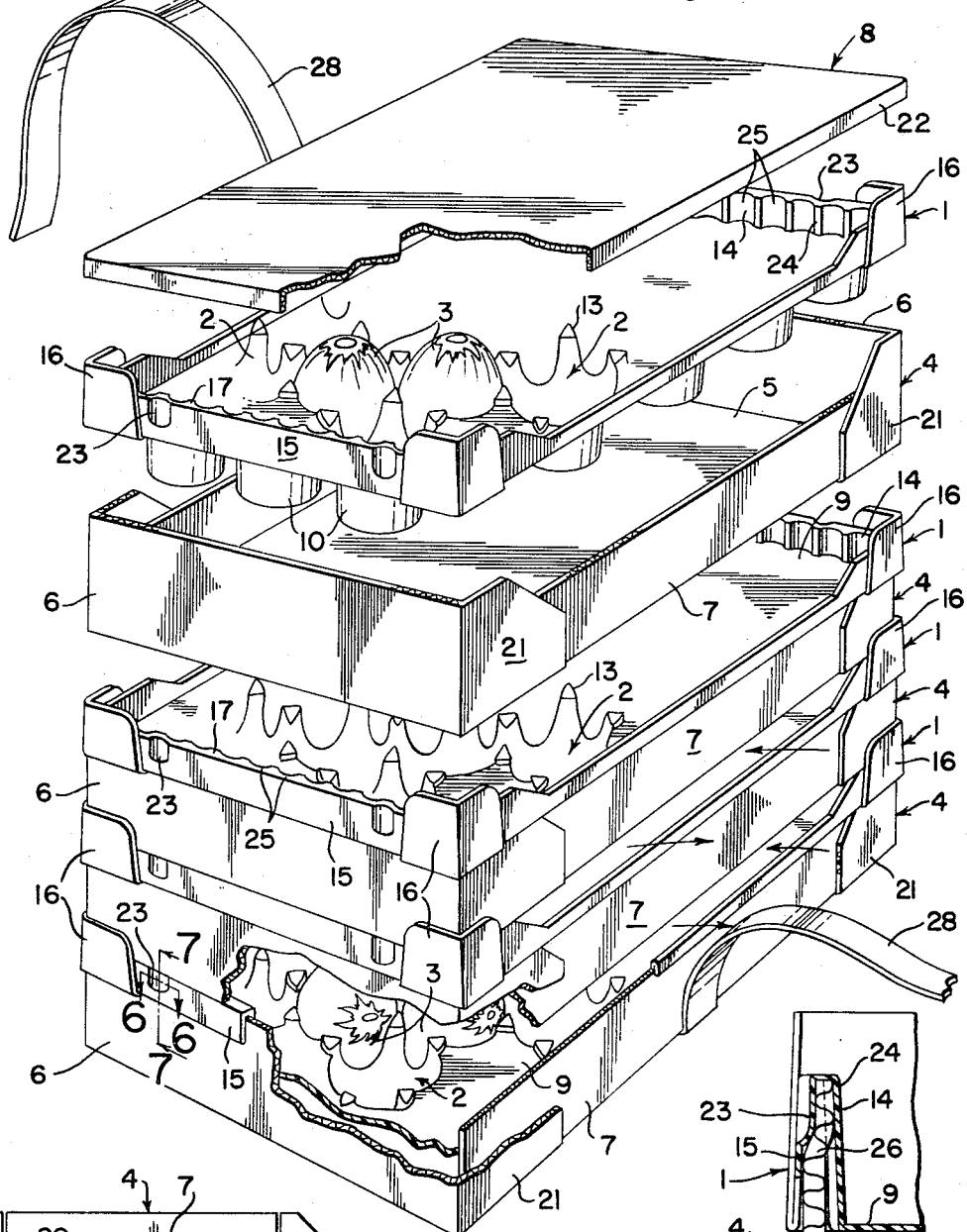
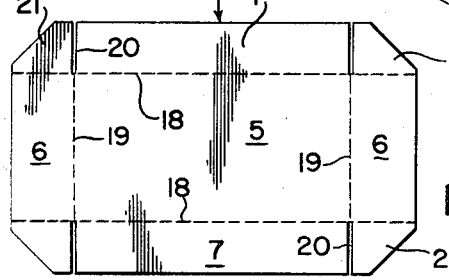
INVENTOR.
HUGH R. WEISS
BY
Medert & TeGrotenhuis
ATTORNEYS Nov. 18, 1969  H. R. WEISS  3,478,867
STACKABLE TRAYS AND PACKAGE FORMED THEREFROM
Filed Oct. 26, 1967  2 Sheets-Sheet 2
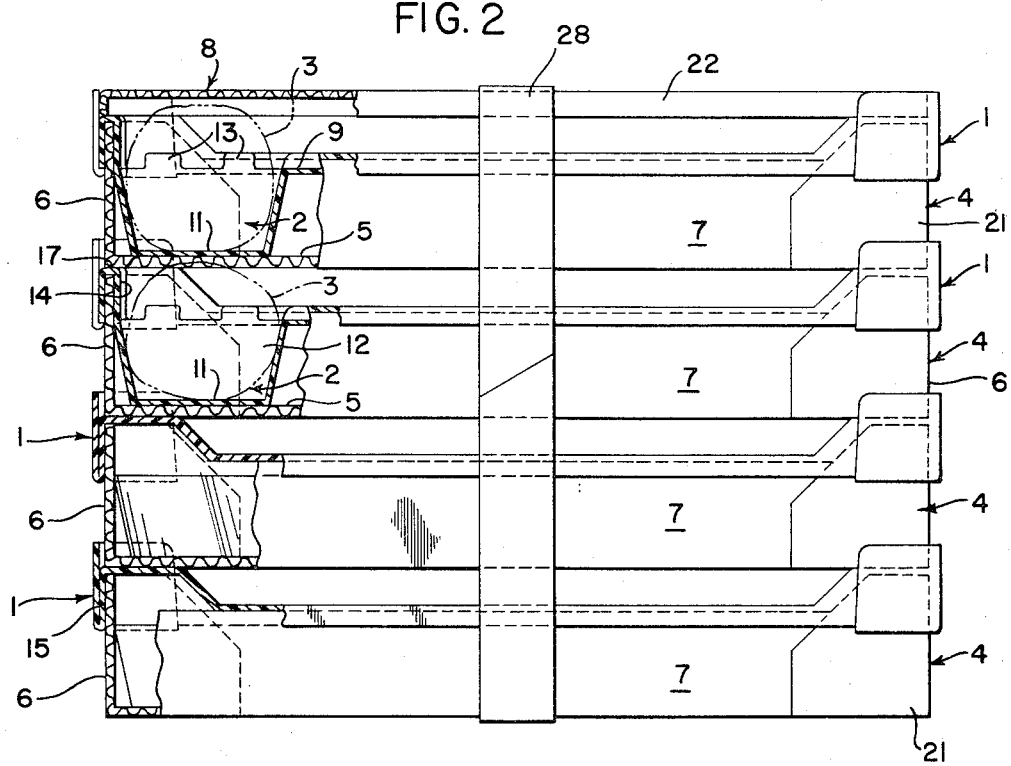
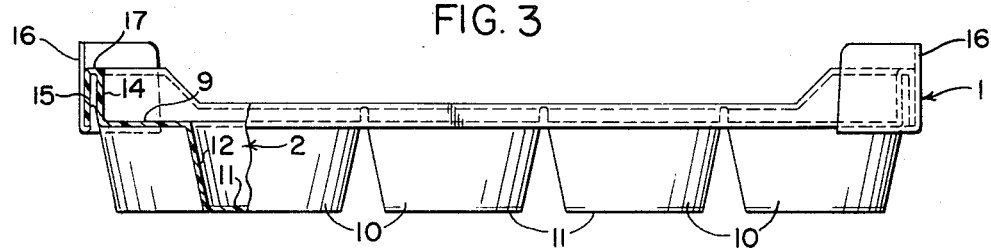
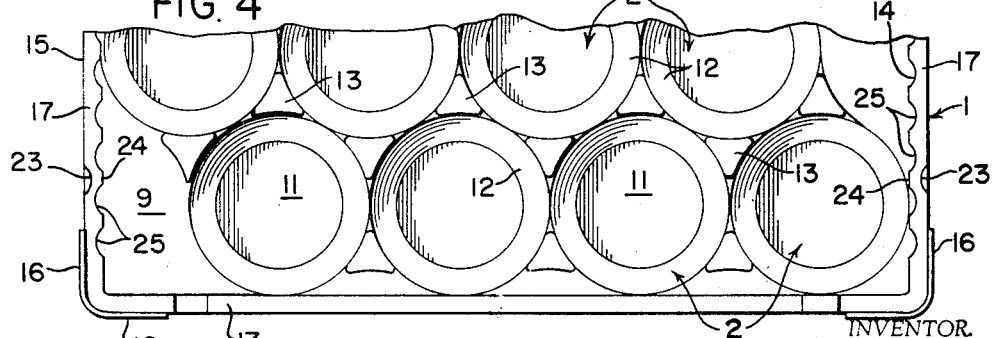
INVENTOR.
HUGH R. WEISS
BY
Medert & Te Grotenhuis
ATTORNEYS United States Patent Office 3,478,867
Patented Nov. 18, 1969

3,478,867
STACKABLE TRAYS AND PACKAGE FORMED THEREFROM
Hugh R. Weiss, Montclair, N.J., assignor to The Pantasote Company of New York, Inc., New York, N.Y., a corporation of New York
Filed Oct. 26, 1967, Ser. No. 678,353
Int. Cl. B65d 1/00, 25/02, 71/00
U.S. Cl. 206—44                                            10 Claims

ABSTRACT OF THE DISCLOSURE

The present invention relates to stackable multicompartment trays formed from thin sheets of thermoplastic resinous materials and adapted to receive and separate articles such as fruit, candy, delicate electronic items and the like. It particularly relates to such one-piece trays which have a peripheral rib of inverted U-shaped section and which may be stacked together with inexpensive interposed, open top boxlike spacers formed of scored and folded cardboard or corrugated paper and having the upper edges thereof disposed within the groove of said peripheral rib to form a multitray shipping, storage or display container without requiring a surrounding and expensive box.

---

The trays of this invention provide an improved means for handling articles which may be of various designs and shapes. They are preferably vacuum-formed or molded from a sheet of thermoplastic resin, particularly a polyvinyl resin such as polyvinyl chloride, high or low-impact polyvinyl benzene (polystyrene), isotatic polyethylene and/or polypropylene and the like.

When fruit is packaged for shipment, it is desired to have the separate pieces supported in separate compartments so that they are protected from bruises. It is also desirable to provide for ventilation of each layer of fruit. When the separate layers of fruit are packaged in trays that are contained in surrounding boxes it is very difficult to coordinate the ventilation ports of the boxes with the spaces between layers of fruit and provide the desired ventilation. Also, boxes used for packaging trays of fruit and other objects are expensive and add greatly to expense of the packaged materials.

It is an object of the present invention to provide a multicompartment tray which has cavities or compartments suitable for receiving fruit or other desired objects and which with co-acting spacing and separating elements may be conveniently stacked and fastened together to form a simple attractive, inexpensive shipping and/or storing container, and which has a plurality of layers of the objects packaged for shipment, storage or display.

It is another object of the present invention to provide a package which may be used for shipment and storage without a surrounding box and which comprises a plurality of multicompartment trays interlocked together with suitable spacing and stiffening elements.

A further object of the present invention is to provide a tray which may be superimposed on other trays together with inexpensive, cooperating, open boxlike spacing elements to provide a multilayer container in which each layer of fruit or articles is separated from each layer and in which means is provided for ventilating each layer of packaged material.

It is a still further object of the present invention to provide a stackable tray together wiht cooperating spacer and stiffening elements in which the elements occupy very little space when empty to provide relatively low shipping costs.

Other objects will be apparent from the following description of the invention as illustrated by the accompanying drawings, in which:

FIGURE 1 is a perspective view, with portions exploded, of a composite package comprising a plurality of the stackable trays with interfitting spacer elements and cover, portions being broken away to show some fruit which may be in some of the cavities of the package;

FIG. 2 is a side elevational view of a package comprising four multicompartment trays, such as are present in FIGURE 1, and cooperating spacers and top, all with portions broken away to show the interfitting of corrugated spacing elements with the molded trays;

FIG. 3 is a side elevational view of a multicompartment tray of the present invention;

FIG. 4 is a plan view of a portion of a multicompartment tray embodying the present invention;

FIG. 5 is a plan view of a stiffening spacer, or bottom element scored and cut for folding to an open boxlike form that cooperates with each tray to form a package as illustrated in FIGURES 1 and 2;

FIG. 6 is a sectional view through an interlocking lug and a portion of the corrugated stiffening spacer element showing the manner in which the spacer element is pinched at certain portions of the tray to hold it securely in position; and FIG. 7 is a vertical sectional view taken on the line 7—7 of FIG. 1 through a locking lug.

Referring more particularly to the drawings, in which like parts are identified by the same numerals throughout the several views, it may be seen that the packages of the present invention comprise (a) a plurality of trays 1, which are formed from one piece of thermoplastic material, such as polyvinyl chloride, polystyrene, polyethylene and the like, generally by a vacuum-forming process, to provide a plurality of cavities 2 suitable for receiving articles such as fruit 3, etc., and maintaining the articles in a fixed position therein, (b) cooperating stiffening spacers 4 which are preferably formed from suitably scored and folded corrugated paper, and (c) a suitable cover member 8 which is adapted to cooperate with the uppermost tray 1 in the package.

The preferred spacers have a generally open top, boxlike contour having a bottom 5, ends 6 and sides 7 formed by folding a scored and cut single sheet of stiff material, preferably corrugated paper, cardboard and the like, at the time of assembly of the package.

The shape or configuration of the cavities of the trays 1 of the present invention may be varied in accordance with usual practice to fit the type of articles which it is desired to package, and the particular shapes of the cavities or compartments 2 form no part of the present invention.

The separate trays 1 comprise a web 9 which connects and supports a plurality of article-receiving compartments 10, which may be cup-shaped, as shown, and which comprise a bottom 11 and sides 12. The compartments 10 may be suitably spaced from each other, as shown in FIGURES 3 and 4. Upstanding posts 13 may be provided to project above the plane of the web 9 to give further support to the fruit, if desired.

Disposed at least at the end portions and part of the sides of each tray and preferably surrounding the entire periphery of the trays 1 is a stiffening rib having an inverted U-shaped cross section. One leg 14 of the rib extends upwardly from the plane of said web and the other leg 15 extends downwardly from the crest 17 of the rib, preferably slightly below the plane of said web 9. The opening in the U of the flange is adapted to receive the upper edge portion of the boxlike spacers 4. At each of the corners of the rib there is disposed a one-piece corner member having walls 16 formed integrally with the outer leg of said rib. The ribs are of S-shape cross section at the corners with the walls 16 preferably formed by a reverse fold of material integral with the outer leg 15 of the rib. The walls 16 extend laterally around the corners, partly down the sides and ends, and are of sufficient height to protrude substantially above the crest 17 of the rib to provide a seat for the bottom of a corner of a spacing member 4, as shown. The walls 16 are integral with both a side and end rib and serve as means to prevent lateral movement of the spacers 4 with respect to the trays 1. The crest 17 of the ribs provides vertical support that carries the load of super-imposed trays. At the medium portion of the side edges of the preferred trays of the present invention, the rib of U-shaped section is of lower height above the web 9 than is the rib at the end portion to provide a space for air to enter between the trays 1 and the bottom of the spacers 4.

The spacers are, as aforesaid, each preferably formed from a single sheet of a relatively stiff material, preferably a material such as corrugated fiber or paperboard which is scored as shown by the dotted lines 18 and 19 on FIG. 5. A cut 20 is formed at each corner to form the tabs 21 and permit the folding of the side and end portions 6 and 7, respectively, at right angles to the central portion 5 so as to form a box. The tabs 21 are thereafter folded about the sides 6. The end portions 7 of the open boxlike spacer are preferably longer than the side portions so as to protrude full depth into the deeper grooves of the ribs at the end portions of the preferred ventilating trays having the side ribs or the portion of the ribs at the sides of lower average height than the end ribs or portions of the ends.

Referring particularly to FIGS. 6 and 7 of the appended drawing, wherein there is shown respectively a horizontal sectional view on the line 6—6 of FIG. 1 and a vertical sectional view on the line 7—7 of FIG. 1, through the peripheral rib of the trays and the cooperating spacer or separator in the vicinity of the interlocking lug 27, it is seen that the inner leg 14 and the crest 17 of the supporting or peripheral rib, at least in the vicinity of the corners, may be scalloped to form inwardly extending vertical protrusions or ridges 24 and associated grooves 25 and thus provide increased vertical load-supporting ability.

Spaced locking lugs or transverse indentations 23 in the outer wall or leg 15 of the peripheral rib adjacent the corners cause portions of the rib to have a generally wedge-shaped cross section so that the upper edge portions 26 of the open boxlike spacers 4 are squeezed tightly within the groove of the rib and stabilize the assembly.

The cover member 8 preferably has a relatively flat upper surface and downwardly extending sides 22. It is thus a relatively shallow inverted open box of size and shape such that the lower side edges are supported on the crest 17 of the end portions of the peripheral grooves and the corner portions are stabilized from relative transverse movement by the walls 16 of the corner members.

Means such as the strap 28 is provided for binding the components comprising loaded trays 1, spacers 4 and cover 8 together to form a unitary package or stack that can be transported from place to place without a surrounding box.

It is also apparent that in accordance with the provisions of the patent statutes modifications of the invention may be made without changing the spirit thereof.

Having described my invention, I claim:

1. A one-piece molded multicompartment tray formed from a thin sheet of flexible, susbtantially inextensible thermoplastic resin, said tray having an upwardly projecting rib at least at each of the end portions of the perimeter thereof, said rib having at least a portion thereof of inverted U-shaped cross section with legs of said rib spaced to provide a groove with an opening at the underside of said rib, a one-piece corner at each intersection of a side and end portions of said rib, said corner having walls integrally attached to said rib and extending laterally some distance along each side of said rib and projecting above the crest thereof, walls of each corner being spaced from walls of other corners, whereby there are formed seats for receiving the corner portions of a suitable open-top boxlike spacer adjacent the intersection of bottom and sides thereof, said seats being adapted to support the bottom of said boxlike spacer on the crest of said rib and to support the sides of said spacers by said walls of said corners.

2. A one-piece molded, multicompartment tray formed from a thin, flexible, substantially inextensible sheet of thermoplastic resin, said tray having a rectangular perimeter and having an endless upwardly projecting rib extending around the periphery thereof, said rib having a generally inverted U-shaped cross section, with legs of said rib spaced to provide a groove at the underside thereof, corner portions of said rib and end portions being higher than side portions intermediate said corner portions, of said rib adjacent the intersection of said side and end portions having an upstanding one-piece vertical corner wall formed of a fold of material integral with the outer leg of said rib, said vertical wall being attached at the lower edge of the outermost leg of said rib and being longer than the downwardly extending leg of said rib and projecting above the crest thereof, whereby it forms a seat for corner portions of the bottom and sides of a suitable boxlike spacer, having a periphery substantially corresponding in shape and size to said tray.

3. A package comprising a plurality of trays according to claim 2, open boxlike spacers of relatively stiff material between successive trays, said boxlike spacers having a bottom portion and integral side and end portions, the upper edge of said side and end portions of each boxlike spacer being received and held within the peripheral groove of said rib of said tray, the bottom of each boxlike spacer underlying the bottom of the compartment of an overlying tray.

4. A package according to claim 3 wherein the corners of the bottom of said boxlike spacers intermediate said trays are disposed on said seat, with the bottom resting on the crest of said groove and the sides and ends are held against lateral movement by said walls of said corners.

5. A combination comprising a tray according to claim 1 and a boxlike member having a bottom and integral sides, upper edge portions of said sides and ends being disposed within said peripheral groove of the rib of an overlying tray, whereby the sides of said boxlike member are maintained in position.

6. A package according to claim 4 which also comprises a cover of stiff material having a flat upper surface and peripheral portions resting on said seats of the upppermost tray of said package.

7. A package according to claim 5 also comprising a cover of stiff material having a flat upper surface and peripheral portions resting on said seats of the uppermost tray of said package.

8. A package according to claim 5 in which said boxlike spacers are formed of a suitably corrugated fibrous material with end portions and side portions, and bottom formed by suitably scoring and folding a single sheet.

9. A package according to claim 8 wherein said peripheral rib is provided with spaced indentations to provide portions of said groove of wedge-shaped vertical section to more firmly wedge and lock the upper edges of said spacers in said groove.

10. A tray according to claim 1 wherein said resin is a vinyl resin.

References Cited

UNITED STATES PATENTS

| | | | |
|---|---|---|---|
| 1,122,522 | 12/1914 | Mandeville et al. | 229—29 |
| 2,990,998 | 7/1961 | Barclay | 220—42 |
| 3,289,828 | 12/1966 | Dick et al. | 206—65 |

FOREIGN PATENTS 1,256,557   2/1961   France.

WILLIAM T. DIXSON, Jr., Primary Examiner

U.S. Cl. X.R.

206—65; 217—26.5; 229—2.5